United States Patent [19]
Paschal et al.

[11] 3,834,298
[45] Sept. 10, 1974

[54] BRICK UNLOADER-STACKER APPARATUS

[75] Inventors: Forrest A. Paschal; Gerald L. Stuart, both of Siler City, N.C.

[73] Assignee: Forrest Paschal Machinery Company, Siler City, N.C.

[22] Filed: Aug. 2, 1972

[21] Appl. No.: 277,266

Related U.S. Application Data

[63] Continuation-in-part of Ser. No. 267,251, June 28, 1972, abandoned.

[52] U.S. Cl................ 100/7, 214/6 A, 214/8.5 C, 214/152
[51] Int. Cl........................................... B65b 13/00
[58] Field of Search.......... 214/6 M, 6 P, 6 FS, 6 A, 214/8.5 C, 8.5 D, 6 G

[56] References Cited
UNITED STATES PATENTS

| | | | |
|---|---|---|---|
| 3,037,644 | 6/1962 | Segur.................................. | 214/6 A |
| 3,656,634 | 4/1972 | Pearne et al........................ | 214/6 A |
| 3,669,283 | 6/1972 | Brown, Jr........................... | 214/8.5 C |
| 3,731,785 | 5/1973 | Stuart................................. | 214/6 A |

*Primary Examiner*—Robert J. Spar
*Attorney, Agent, or Firm*—Charles R. Rhodes

[57] ABSTRACT

Brick are unloaded from a kiln car one double-layer course at a time and formed into a stack at a receiving station by a combination unloader-stacker head rather than being unloaded by one apparatus and transferred along a conveyor to a stacking apparatus in single or double-layer courses or rows. During the unloading and stacking, a tyne course pickup head is operated synchronously with the unloader-stacker head to form a tyne course at a prescribed position in the stack. The receiving station may be either an elevator operated table or a set of powered conveyor rollers onto which the brick stack is formed. Completed stacks formed by the unloader head are then transferred as a unit to the stacking head.

21 Claims, 12 Drawing Figures

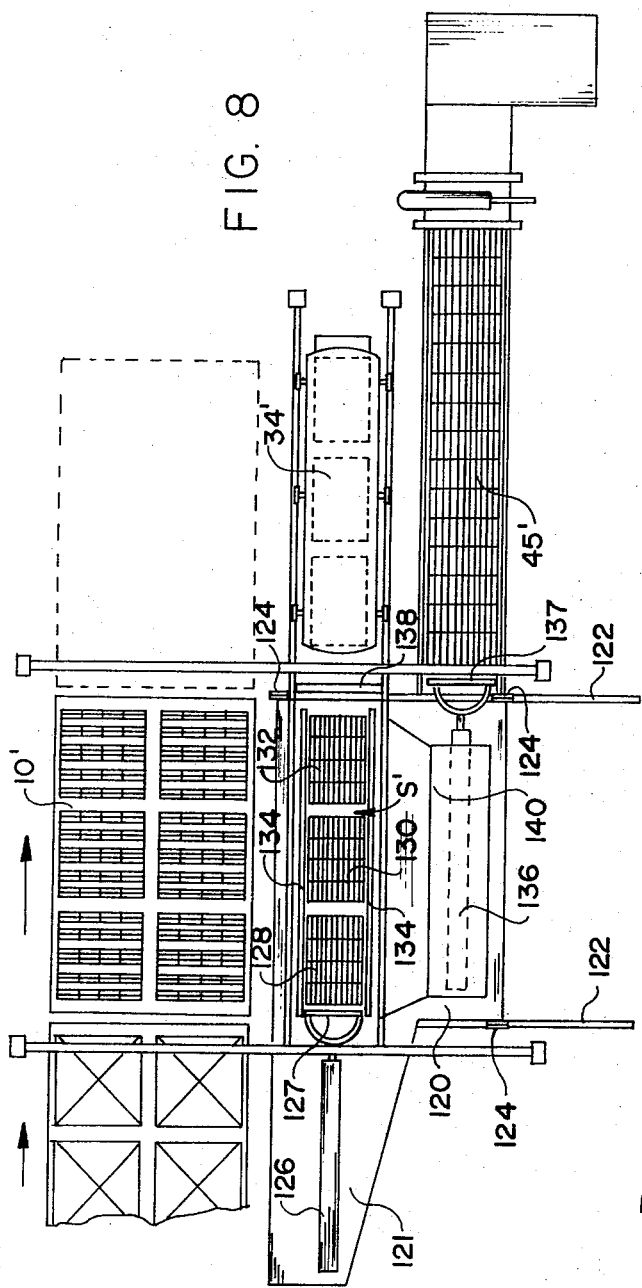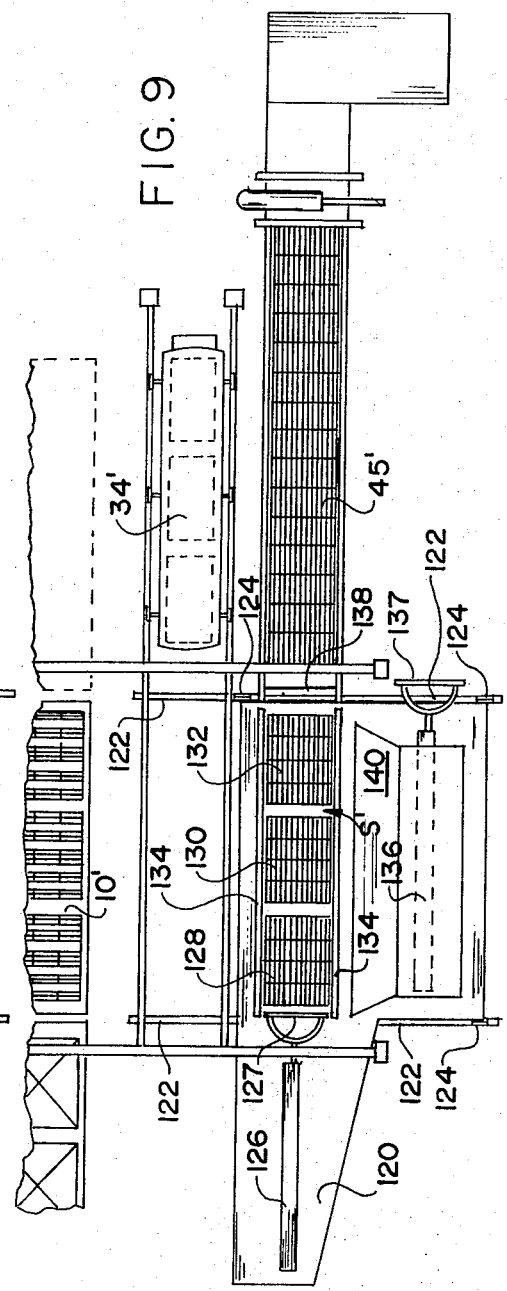

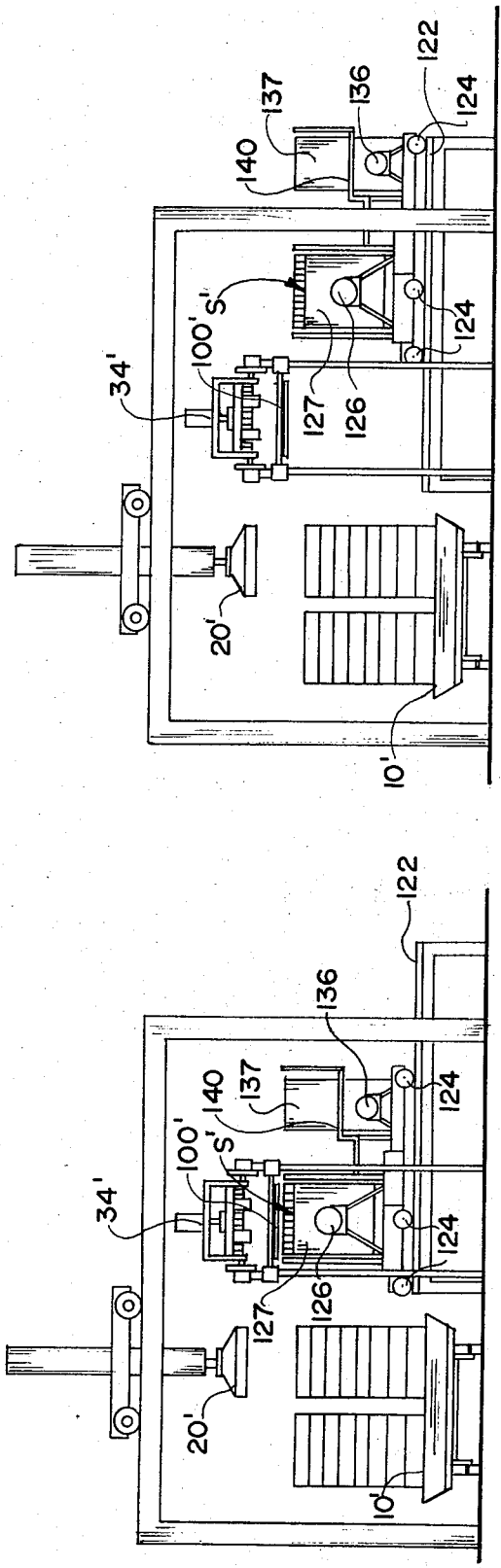

BRICK UNLOADER-STACKER APPARATUS

REFERENCE TO RELATED APPLICATIONS

This application is a continuation-in-part of applicant's co-pending application Ser. No. 267,251, filed June 28, 1972, now abandoned.

BACKGROUND OF THE INVENTION

In the processing of brick through a brick plant, up until recent years, after the fired brick were removed from the kiln, the kiln cars were unloaded by hand and formed into stacks of desired configurations. Several years ago stacking apparatuses were developed whereby brick proceeding along a conveyor in single or double layers were formed into stacks 10 or more courses high, with a strap encircling the courses to form a brick package.

Then very recently, subsequent to the acceptance of such stacking machines by the brickmaking industry, machines have been developed for automatically unloading kiln cars and placing the brick one or two courses high on the conveyor feeding the stacking apparatus. The unloading of brick from a kiln car is unique in that no matter how much care and precision is maintained in placing the brick on the kiln car prior to the firing in the kiln, as the brick is fired, it tends to shift on the kiln car due to shrinkage and subsequent movement of the kiln car causes the load to shift even further. Therefore, with the advent of unloading machines, it was necessary to prove to the industry that brick could be properly unloaded by machine from a kiln car, and during this time it was not feasible to attempt to manufacture a machine that would feed directly into the stacking apparatus without providing some type of intermediate conveying apparatus whereby the kiln cars could be unloaded by hand if the unloading machine failed. Further, brick are sometimes made in such varying sizes and in such small amounts that it is easier to unload kiln cars by hand than to reset an unloading machine to unload a few bricks of a different size. Therefore, it has generally been accepted that in plants where a stacking apparatus and unloading apparatus are used in conjunction with each other, that some type of conveyor system is utilized therebetween onto which bricks from the kiln car are placed one or two layers high and conveyed therealong to the stacking apparatus.

The machine unloading concept has proven capable of unloading large quantities of brick with good results, so that conveying for this reason alone is no longer always desirable. Some brick making plants are interested in turning out high brick production, and in this regard the separation of the unloading machine and the stacking apparatus and the conveyor line therebetween is a waste of time which creates additional operations that might be eliminated.

SUMMARY OF THE PRESENT INVENTION

The present invention combines the unloading and stacking functions in one apparatus, and therefore eliminates the need for a separate stacking machine and a conveyor apparatus between the kiln car unloading apparatus and the stacking apparatus. In this respect, brick are unloaded from a kiln car having a plurality of double-layer courses stacked thereon by means of an unloader-stacker head which removes the bricks a double-layer course at a time from a stack on the kiln car and places the double-layer course at a receiving station. The unloader-stacker head subsequently removes the next successive double-layer course from the stack and places it atop the course already positioned at the receiving station. By continuing these steps, the bricks may be unloaded from the kiln car and stacked to a desired height by the unloaded-stacker head alone, without the necessity of a second, relatively expensive stacker mechanism.

Working in conjunction with the unloader head is a tyne course pickup head which is operated after the unloader head positions the second double-layer course at said receiving station. The tyne course pickup head removes the upper layer of said second course and selected tyne brick from the lower layer thereof and is moved to a point above an auxiliary table whereonto the tyne brick from said lower layer are released. The upper layer is subsequently returned to the stack at some time between operations of the unloader-stacker head.

The tyne course pickup head may be operated after each operation of the unloader head, if desired, to lift the upper layer of each course so that an operator can place a separator sheet between adjacent layers of the final stack; this is especially necessary where the brick are to be shipped by rail.

The placing of the brick at the receiving station may be effected in one of three ways. First, an elevator table may be utilized onto which brick are released at the same level after each cycle of the unloader-stacker head either directly onto the elevator table surface or onto the preceding course deposited thereon, whereupon the elevator will lower so that the release point is always at the same elevation. Secondly, a receiving plate may be utilized in combination with the elevator table whereby the brick are first deposited onto the receiving plate by the unloader-stacker head, then the plate is slid out from beneath the course of bricks so that they are deposited onto the elevator table or the stack formed thereon. Thirdly, the surface of the receiving station may remain at the same elevation and the unloader head be operated to release the brick at different elevations depending on which course is being placed on the stack.

After the stack is completely formed, a combination of pushers and/or conveying equipment moves the formed stacks into position for strapping and subsequent storage.

It is therefore an object of the present invention to provide an improved apparatus and method for unloading brick from a kiln car and forming the brick into stacks in preparation for strapping.

It is a further object of the present invention to provide an apparatus and method of the type described wherein the brick are unloaded and simultaneously formed into stacks of proper size and shape for strapping, rather than being unloaded into one or two-layer courses which are carried off by a conveyor to a separate stacking apparatus.

It is yet a further object of the present invention to provide an apparatus and method of the type described whereby brick are removed from a kiln car, simultaneously formed into stacks at a receiving station, with the tyne course being formed therein during the stacking.

DESCRIPTION OF THE DRAWINGS

Other objects of the invention will become apparent upon reading the following detailed description of preferred embodiments of the invention along with an inspection of the accompanying drawings, in which:

FIGS. 2 and 3 are sectional views of the apparatus taken substantially along lines 2—2 and 3—3, respectively, of FIG. 1 and showing both the unloader-stacker head and the tyne course pickup head;

FIGS. 8 and 9 are plan views illustrating sequentially another alternate embodiment for transferring completed stacks from the receiving station to the strapping head;

FIGS. 11A and B are end views illustrating sequentially the apparatus of the embodiment shown in FIGS. 8–10.

DETAILED DESCRIPTION OF THE INVENTION

Figure 1:
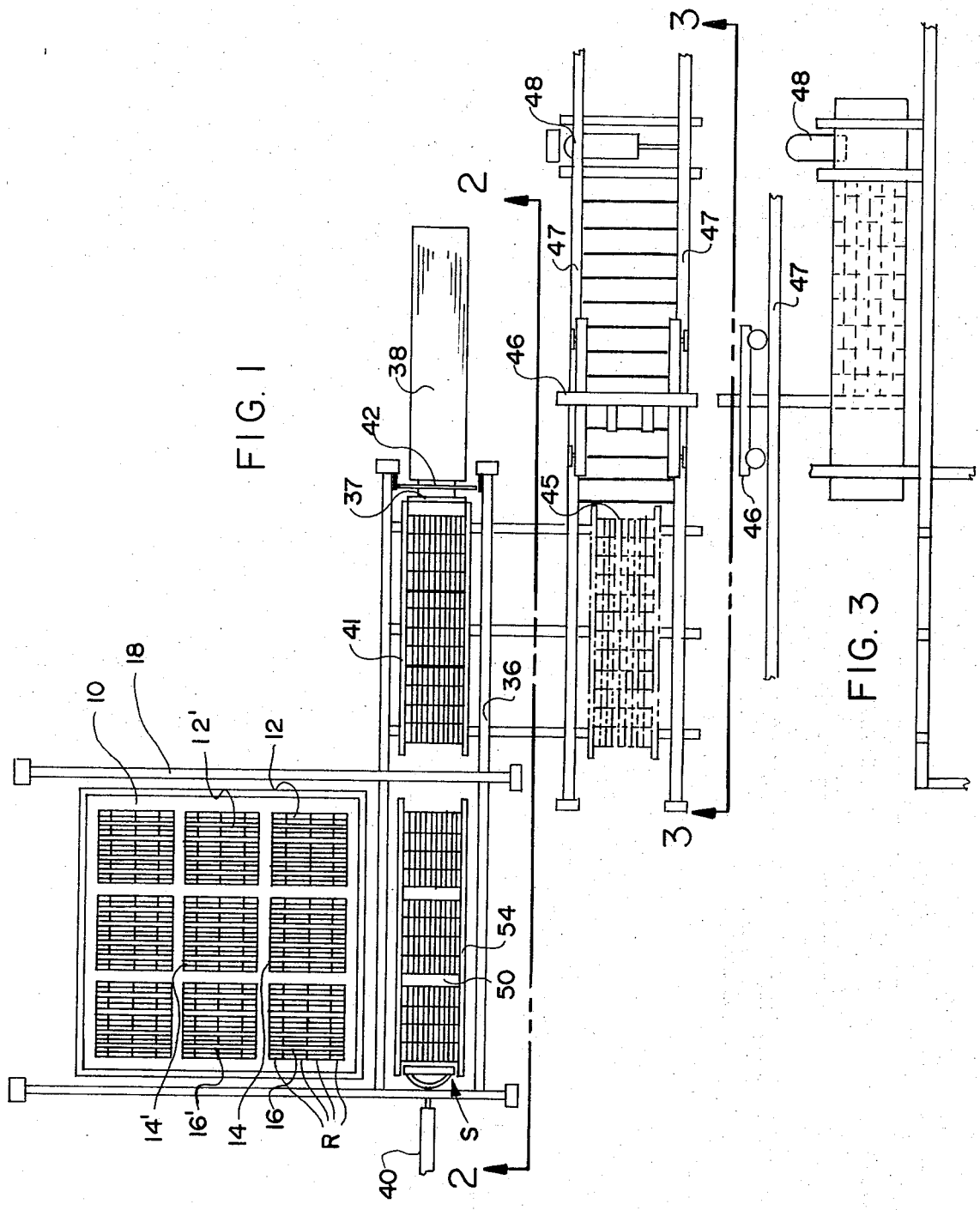
FIG. 1 is a plan view of the apparatus according to the present invention with the unloader-stacker head and tyne course pickup head removed for the sake of clarity.
Figure 2:
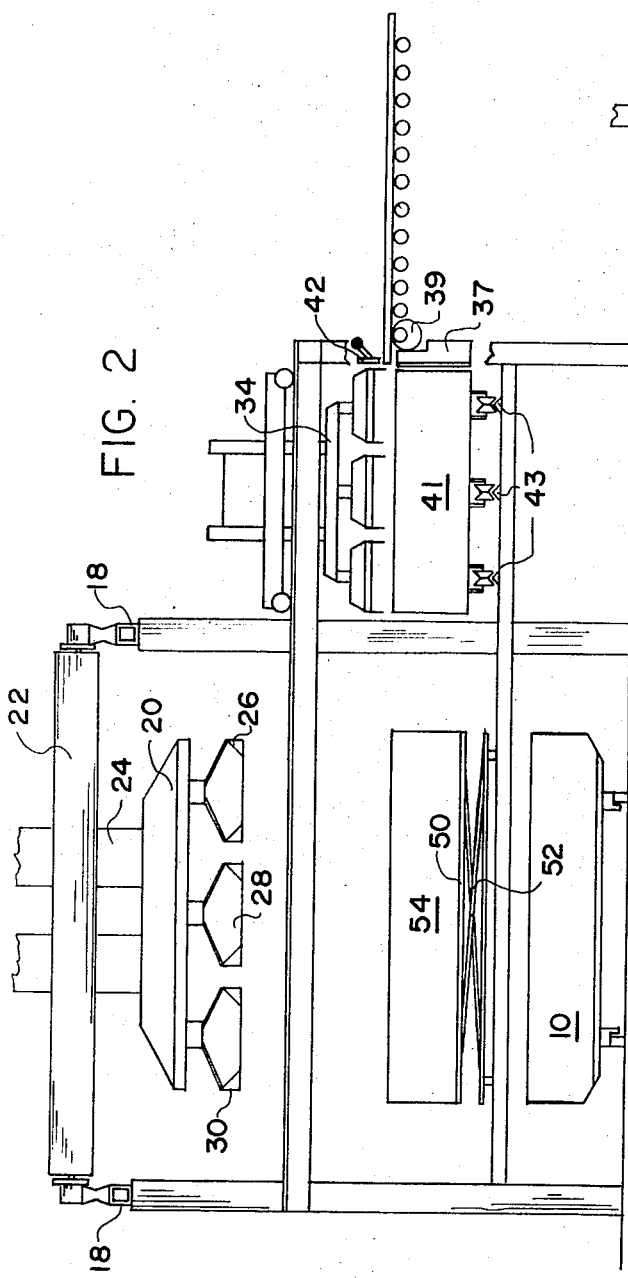
Figure 4:
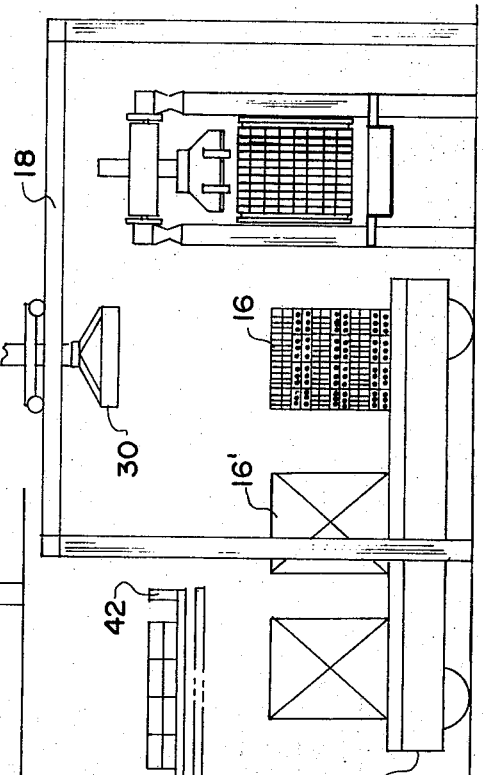
FIG. 4 is an end view of the apparatus according to the present invention.

Turning now to the drawings (FIGS. 1–4), bricks arrive at the unloader-stacker apparatus of the present invention from a kiln (not shown) where they have been fired on kiln cars. In accordance with conventional practices, the bricks are arranged on kiln cars 10 in a plurality of stacks, two or three stacks across the width of the kiln car 10 and two-four stacks along the length thereof. However, for the purposes of this application there are shown three stacks 12, 14, 16 across the width with each stack comprising a plurality of double-layer courses, each successive course having the headers thereof facing perpendicular to the headers of the preceding course. Each layer as illustrated comprises four rows R with 11 bricks in each row. It should be understood that the arrangement of bricks in four rows of 11 bricks per row is illustrative only and the layers may comprise other well-known arrangements with differing numbers of rows and with a different number of bricks in each row; i.e., three rows of eight, nine or 10 bricks in each row. This arrangement of double-layer, alternate facing headers is according to conventional setting practices, and forms no part of the present invention. As kiln car 10 arrives from the kiln, it is positioned adjacent a receiving station S, to be described more in detail hereinafter. The kiln car 10 may be moved in a direction perpendicular or parallel to the brick flow path from the receiving station to the strapping station; however, in the illustrated embodiment, the kiln car moves perpendicular to the flow path and passes beneath the receiving station as it is unloaded, with a row of stacks being removed after each movement of the car.

A first pair of rails 18 extend between and above the kiln car 10 and receiving station S and support a first pickup means or head 20 which reciprocates back and forth between the kiln car and receiving station on a wheeled carriage 22 in any of several well-known manners. Head 20 includes a hydraulic means 24 or other similar means for reciprocating the head in a vertical path between an upper position, and one of several lower pickup or release positions for picking up a double-layer course of brick or depositing the double-layer course of brick at the receiving station. Such a pickup head is described in detail in U.S. Pat. No. 3,669,283, issued June 13, 1972 and assigned to the assignee of the present application, except that said patent shows a pickup head for lifting courses from one stack at a time only. The present application uses a plurality of heads to lift bricks from one, two or three stacks simultaneously.

In accordance with the present invention, successive courses are removed one at a time from each of stacks 12, 14, 16 and, following planar reorientation of alternate ones and longitudinal compacting of the rows R in each, the courses are placed at the receiving position by the unloader head.

The loaded kiln cars 10 supporting the stacks 12, 14, 16 of the fired bricks are moved along conventional tracks (not shown) to the unloading station, occupied in the drawings by the car 10, adjacent receiving station S. The car is halted while the three stacks closest to the receiving station are removed therefrom, and then is indexed forwardly for a portion of its length, passing beneath the receiving station whereby the next three stacks of brick may be unloaded. After unloading of all stacks on the kiln car, the empty car is moved further forward, in the direction of the previously emptied car, and passed eventually from beneath the receiving station.

As substantially taught by previously identified U.S. Pat. No. 3,669,283, the unloader-stacker head comprises a first pickup means or head 20 mounted for multi-directional movement above a car 10 at the unloading station by means of a wheeled dolly 22 as previously mentioned. Vertically movable shaft 24 depends from carriage 22, and three pivotally movable frames 26, 28, 30 support the gripper means, each of which grips a double-layer course when activated. Shaft 24 and frames 26, 28 and 30 are so connected to each other as to permit horizontal pivotal movement of the frames through an arc of at least 90°. In unloading a car 10, head 20 is lowered onto the uppermost course of stacks 12, 14, 16 and grippers (not shown) grip the upper course of each stack along opposite ends of the rows R, compacting the rows thereof in the direction of their length (the width direction of the individual bricks). Head 20 is then raised, carriage 22 moved to a position closely above receiving station 14, and the grippers caused to release the compacted course upon the receiving station S. While transporting alternate courses between car 10 and receiving station, frames 26, 28 and 30 pivot 90° in a horizontal plane so that each course deposited upon the receiving station S has its rows R extending in the same direction, notwithstanding the alternating header-stretcher orientation of the courses within the stacks 12, 14, 16. After unloading the uppermost course from stacks 12, 14 and 16 and depositing them on the receiving station, head 20 returns to the unloading position and similarly successively unloads four more courses from each of stacks 12, 14, 16 and deposits them on top of the previously unloaded course and atop each other at the receiving station to form three spaced stacks ten courses high, which is the proper height for the strapping operation. The spacing between stacks at receiving station S is necessary in order that the next operation may be effected which requires lifting the layers by the ends of the bricks. The height of the stacks on the kiln cars may or may not coincide with the height of the stacks to be strapped, however the head continues to remove courses one at a time from each stack on the kiln car until the stack is completely finished, whereupon the kiln car is moved forward and the next series of stacks, 12', 14' and 16' are unloaded.

As the second group of three courses from stacks 12, 14 and 16 are deposited at the receiving station, it is desirable to form tyne course openings in the lower layer thereof by removing certain bricks therefrom. In this regard, a tyne course pickup head 34 is mounted on a second set of rails 36 extending between the receiving station and an auxiliary platform 38 providing clearance for the movement of said head 20. Rails 38 and rails 18 are so arranged that unloader-stacker head 20 and tyne course pickup head 34 do not interfere with each other, nor with the other set of rails during operation. The tyne course pickup head is described in a commonly-assigned patent application Ser. No. 249,031, filed May 1, 1972, the details of which are hereby incorporated by reference. Generally, the tyne course pickup head 36 as described in said application includes a head which is vertically reciprocal and adapted to be lowered to a position overlying a selected double-layer course of bricks. A first set of gripper members is activated to grip the entire upper layer by the headers of the outer rows while a second set of grippers, independently operated from the first set, is activated to grip selected bricks in the lower layer in the same manner, the selected brick being those necessary to form the tyne openings. The pickup head is then moved vertically and horizontally to a second position where the selected bricks from the lower layer are deposited on an auxiliary table. The tyne course pickup head then holds and subsequently returns the upper layer back to the stack of bricks from whence it came at the end of one of the successive cycles of the unloader-stacker head. Again, since the illustrated embodiment is operated on three stacks of brick at once, the tyne course pickup head comprises three gripper frames instead of one as illustrated in application Ser. No. 249,031.

In the present employment of the tyne course pickup head 34, however, it must be operated after the second course is placed on the stack at the receiving position while the unloading head 20 is returning to the kiln car 10 to unload the next set of three courses. The tyne course pickup head 34 is activated at this time, removes the upper layer of the second course and the tyne brick from the lower layer, and transfers them to a position above the auxiliary table from whence the tyne brick are released onto the table. The unloader head 20 continues to work, and the upper layer of the second course can be returned to the stack after any of the third, fourth or fifth courses are deposited on the stack at the receiving station returning the upper layer of the second course thereto. It makes no difference where in the formation of the stack that upper layer of the second course is returned.

An auxiliary table 38 is mounted at a position beneath the retracted position of the tyne course pickup head 34 so that the tyne brick removed from the lower layer of the second course may be deposited thereon. Auxiliary table 38 may take one of several forms; it may be merely a stationary plate; it might be a tiltable plate so that the brick deposited thereon are slid into a storage area, whereupon an operator may manually build a stack at a manual stacking station located nearby; or the auxiliary table 38 may be a slidable plate mounted, as shown in FIG. 1, in the path of the bricks as they are pushed from one end of the receiving station to the other at an elevation coinciding with the upper surface of the fourth course of bricks in the receiving station S. In the latter case and until the table 38 is filled with a set of three double-layer courses, as the bricks are pushed forward by a pusher 40, plate 38 moves in the same direction to provide clearance for the incoming bricks. The ninth and tenth layers are being built on the table, and when an operator using the tyne brick deposited on plate 38 has built up a set of two layer courses corresponding to the number of stacks being built at the one end of the receiving station, and upon a signal during one cycle, the unloader head 20 only builds stacks of four courses (eight layers) (or other programmed number of layers in a completed package less two). Upon completion, the four course stacks are pushed by pusher 40 toward the other end of the receiving station into a mobile barrow 41 and against a stop plate 37. The auxiliary table 38 remains in position so that the stacks are pushed thereunder. Then a gate 42 is lowered in a conventional manner and table 38 activated by orbital motor 39 or any other conventional drive means. As the table moves to the position shown in FIG. 1, the gate 42 prevents the bricks from moving with the table and slides the bricks onto the tops of the three stacks, forming the ninth and tenth courses. The mobile barrow 41, which is mounted on rails 43 between the other end of the receiving station and a position adjacent the end of strapping table 45, is then activated by a second motor or pushing mechanism (not shown) and moves the entire three stacks in the mobile barrow laterally to the position adjacent the end of strapping table 45. A two-speed pushing gate assembly 46 mounted on rails 47 moves the entire stack first at a rapid speed to clear mobile barrow 41 onto strapping table 45, then at an indexing speed along table 45 into the strapping head 48, as the mobile barrow 41 returns to the receiving station in time to receive the next stacks.

The receiving station may take several forms. As shown in FIGS. 1–4, the one end of the receiving station comprises a table 50 supported underneath by a scissors lift mechanism 52 which is commercially available from American Manufacturing Company, Inc. of Tacoma, Washington as described in its Bulletin No. AMC–3175. A pair of side walls 54, 56 extend up on either side of table 50 to form a receiving barrow, whereby as the table 50 is lowered by the scissors lift 52, side walls 54, 56 provide lateral support for the stacks to prevent tipping. Side walls 54, 56 do not interfere with the stacking operation as the bricks are initially deposited on table 50 or the upper surface of other stacks at a level above the side walls. The lower position of the table 52 coincides with the floor of mobile barrow 41, so that when the stacks are completed, the bricks are easily pushed off table 50 and into mobile barrow 41. In order to facilitate the aforementioned transfer, both table 50 and the floor of the mobile barrow may be provided with a plurality of freely rotating rollers.

By using such an apparatus at the receiving station, the unloader head 20 and the tyne course pickup head 34 at the receiving station are always moved to the same elevation, eliminating the necessity for providing a probe device on each head for determining when the top of the stack is reached by the head. As each course is deposited on the receiving station, the scissors lift 52 automatically lowers a distance equal to the height of the course, so that the succeeding course will be deposited at exactly the same horizontal level.

Figure 5:
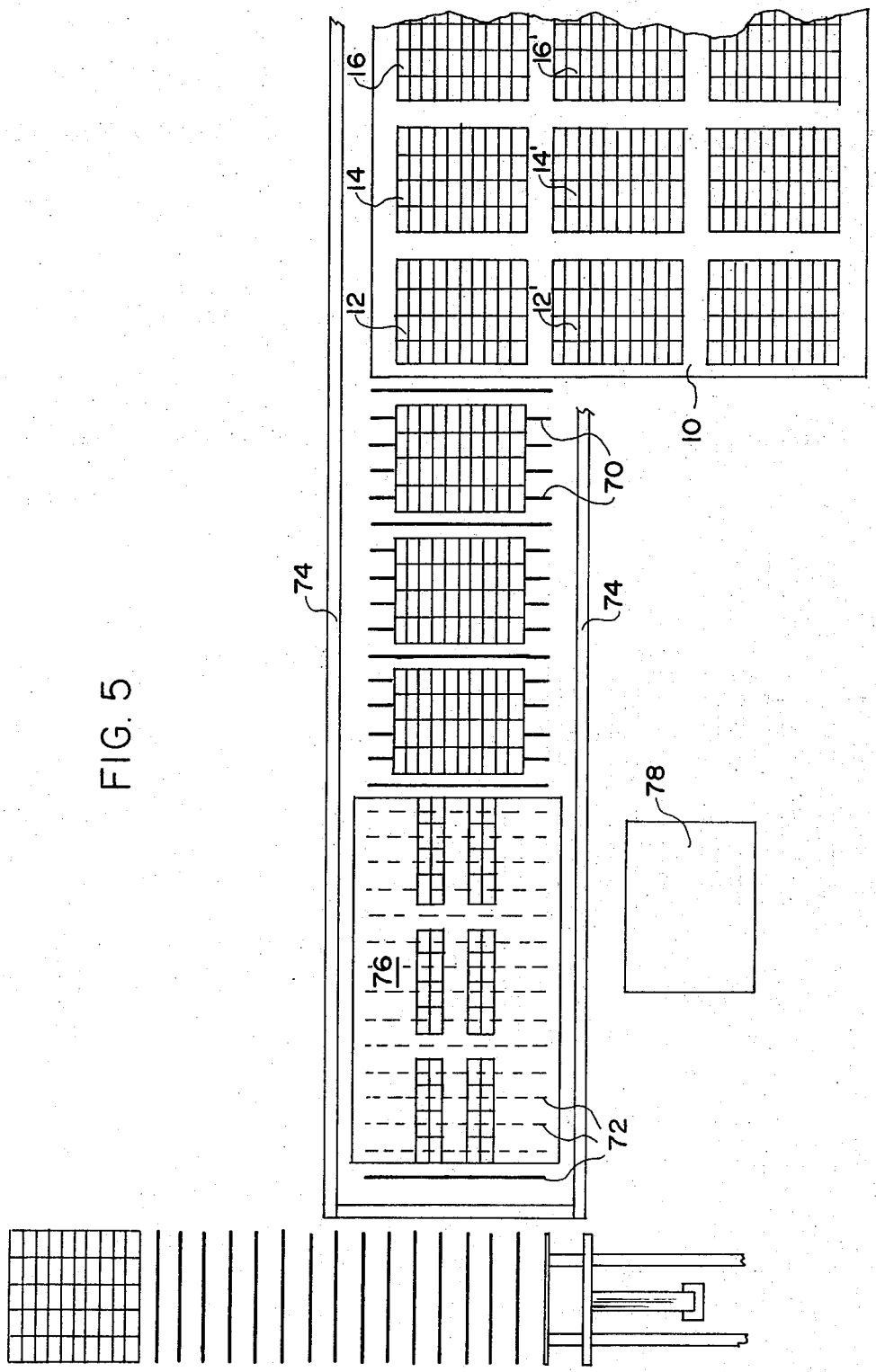
FIGS. 5 and 6 are plan and elevation views, respectively, illustrating an alternate embodiment of the receiving station with the unloader-stacker head and the tyne course pickup head removed in FIG. 5 for the sake of clarity.
Figure 6:
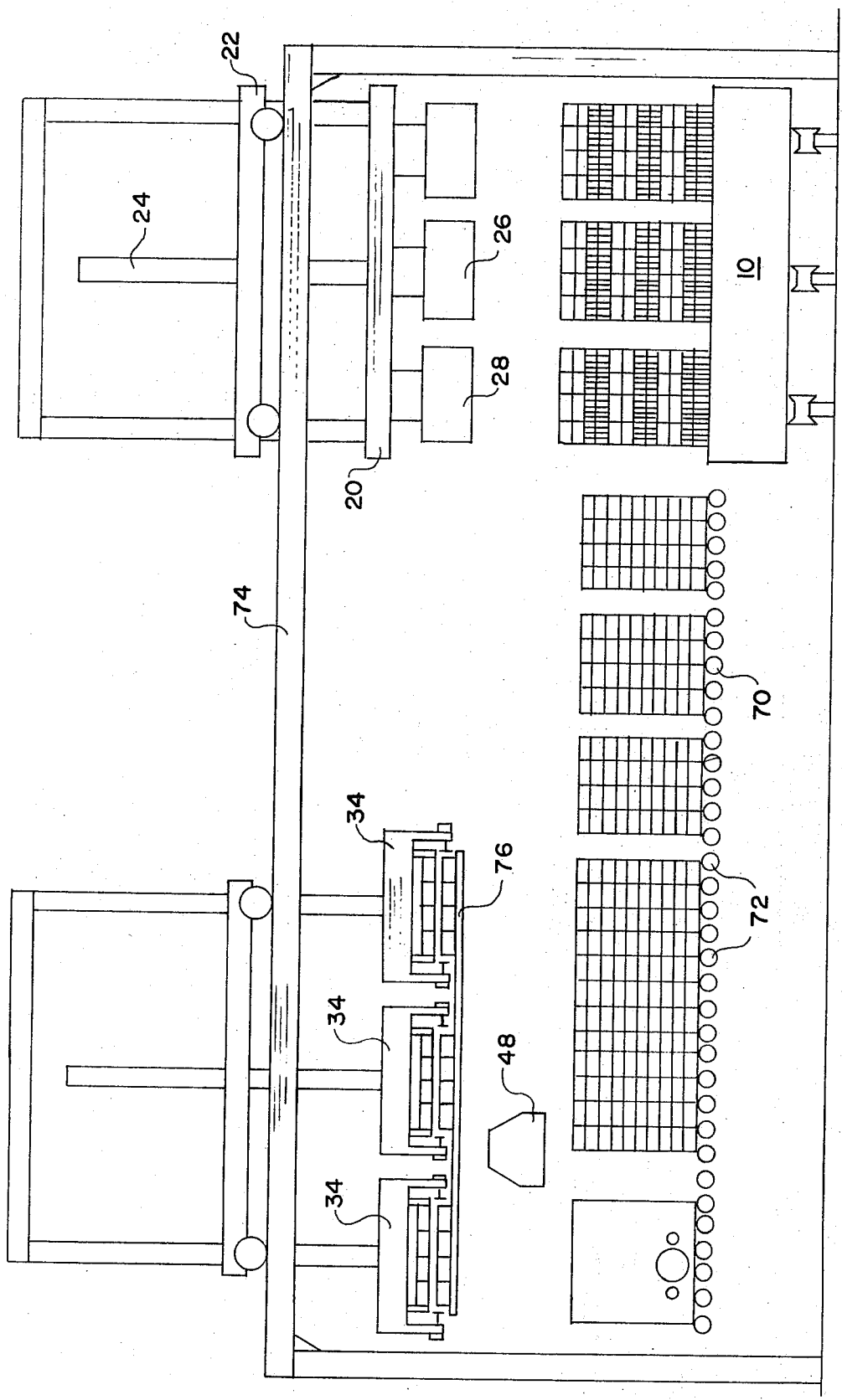
Figure 10:
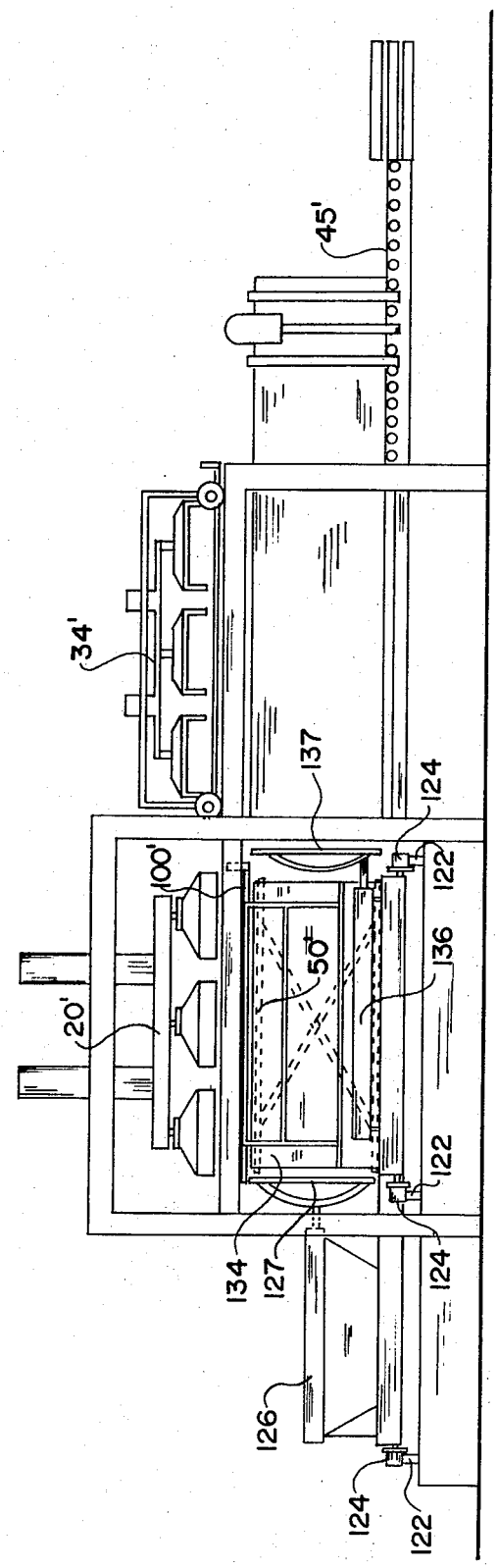
FIG. 10 is an elevation view of the apparatus illustrated in FIG. 8.

As shown in FIGS. 5 and 6, however, it is possible for the receiving station to comprise merely a series of powered rollers 70 or the like which are not moved vertically as the stacks are placed thereon. In such a case, it is necessary to provide both the unloader head and the tyne course pickup head with means for sensing the upper surface of the stack as it is formed to determine when the bricks held therein should be released, however there are conventional means available for such functions, which form no part of the present invention.

Figure 7:
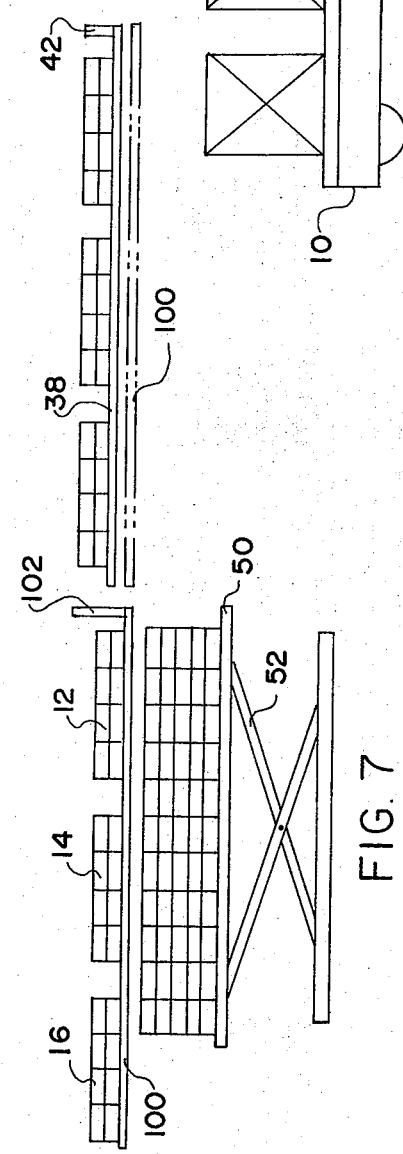
FIG. 7 is a schematic illustration of a second alternate embodiment illustrating the receiving station portion of the apparatus only.

In another alternative embodiment shown in FIG. 7, as the brick are removed from the kiln car 10, they are not placed directly on table 50 or on top of other bricks. Rather they are deposited on a sliding table 100 which is adapted for sliding movement similar to plate 38. After the bricks are deposited on plate 100, the plate is slid from beneath the bricks toward the dotted line position and as the bricks engage a lowered gate 102, the ends of the rows are aligned and the bricks are dropped onto table 50 or onto the preceding course. Table 100 is so arranged relative to table 38 that as it is slid from beneath the bricks it slides beneath table 38. When a complete double-layer course is built on table 38, table 38 is slid away from beneath the bricks thereon as described hereinabove, the tyne brick which have been built into full courses on plate 38 are deposited onto plate 100. As the plate 100 returns to its normal position above table 50, the gate 102 is raised, allowing the bricks on table 100 to pass thereunder, whereupon the next course to be deposited at the receiving station is then already in position on plate 100 for depositing onto the courses in the receiving station. The gate 102 is then lowered and the unloader head 20 is deactivated for one cycle while the plate 100 is again slid to the right and the courses thereon deposited on the receiving station.

In the embodiment illustrated in FIGS. 1-4, the stacks are transferred laterally in the mobile barrow 41 over to the strapping table 45 rather than transferring the stacks directly from the receiving station S into the strapping head 48 in straight line fashion, because the strapping head must receive the bricks at a continuous, slow rate, while it is necessary to move the stacks formed in the receiving station S rapidly out of the way to prepare for the next set of lower courses to be deposited thereon. Therefore, the arrangement in FIGS. 1-4 allows the stacks in the receiving station to be removed at one speed and the stacks to be fed into the strapping head 48 at another. Also, by pushing the bricks from receiving station S into mobile barrow 41 against a stop plate 37, the ends of the brick rows R are aligned to insure proper forming into packages at the strapping head 48.

Alternately, instead of the first pusher element 40, it is possible that the receiving station might be provided with a set of powered rollers 70 onto which the stacks 12, 14, 16 of brick are stacked. As the stacks are completed, the power rollers are activated at a relatively rapid speed to move the stacks onto a second set of powered rollers 72, operated at a slower speed which is appropriate for feeding the stacks into the strapping head. In this manner as illustrated in FIGS. 5 and 6, there is provided a straight line method between the receiving station S and strapping head 48, whereby the unloader-stacker head 20 and the tyne course pickup head 34 are mounted on the same set of rails 74 with the kiln car being moved into position in line with the front end of the linear path from the receiving station to the strapping head 48. With this embodiment is also illustrated a tilt table 76 onto which the tyne brick are placed. The tilt table may be selectively operated by an operator to dump the brick deposited thereon into a tray or other storage device, from which brick packages may be formed and strapped at a manual strap table 78.

Another alternate embodiment is illustrated in FIGS. 8-11 wherein the receiving station S' is laterally shiftable to a position adjacent the front end of the strapping table, from which the bricks are transferred directly from the receiving station onto the strapping table. More specifically, the receiving station S' of this embodiment preferably includes an elevator operated table 50' and retractable plate 100' similar to that shown in FIG. 7 arranged on one side of the platform 120 which in turn is mounted on rails 122 by means of wheels 124 for reciprocal movement back and forth between a first unloading position adjacent kiln car 10' and a second transfer position where the bricks deposited by unloader head 20' are aligned with the longitudinal axis of strapping table 45'. A first pusher cylinder 126 (air cylinder) is mounted on an extension 121 of platform 120 in operative alignment with the group of stacks 128, 130, 132 as they are deposited on one side of platform 120 between a pair of support walls 134 which prevent toppling of the bricks as they are stacked. A plate 127 is secured to the free end of cylinder 126 and is approximately the same size and shape as the cross-sectional dimension of stacks 128, 130 and 132, so that when cylinder 126 is activated plate 127 moves between walls 134, engages and transfers the brick stacks. A second pusher or index cylinder 136 including a plate 137 on the free end of the piston thereof approximately the same size and shape as plate 127 is mounted on the other side of platform 120 (FIG. 8) and, when the platform is in the first position, is normally in operative alignment with strapping table 45' for indexing the bricks thereon into the strapping head. A vertically reciprocal gate 138 is mounted on or adjacent platform 120 adjacent the ends of support walls 134 and is of substantially the same size and shape as the end dimensions of completed stacks 128, 130, 132. Gate 138 is movable between an operative position blocking movement of the bricks from platform 120 upon activation of pusher cylinder 126 and an inoperative or retracted position allowing movement of the bricks onto strapping table 45'. An operator's platform or stand 140 is mounted on platform 120 between one of the walls 134 and the index cylinder 136 so that an operator may ride with platform 120 and continually inspect and insert sheets and/or planks between courses and/or layers of bricks in stacks 128, 130, 132.

In the operation of the embodiment illustrated in FIGS. 8–11B bricks are unloaded from kiln cars 10' and transferred to plate 100' as three separate stacks 128, 130, 132, the stacks being grouped together and placed on table 50' with a tyne layer formed as described in the description of FIG. 7 hereinabove. The first pusher cylinder 126 is activated to urge all three stacks together against gate 138 which is in the up or operative position covering the end of the passageway between support walls 134, thereby aligning the ends of the bricks in preparation for the strapping operation. The gate 138 is then lowered, index cylinder 136 retracted, and the platform 120 transferred laterally to a position (FIG. 9) where the bricks thereon are aligned with strapping table 45'. First cylinder 126 is again activated whereupon the bricks are moved from between support walls 134 onto the strapping table 45'. Cylinder 126 is retracted and platform 120 returns to its normal position whereupon index cylinder 136 is activated to feed bricks into the strapping head at the proper speed. So arranged, transfer of the bricks take place in a minimum number of steps and an inspector may be positioned on the platform 120 at all times between index cylinder 136 and receiving station S' to continuously inspect each course of bricks at receiving station S' without any equipment passing over his head.

In the operation of the device, a kiln car 10 is moved into the unstacking position adjacent the receiving station S. A stack or stacks of courses is built at the receiving station in preparation for a strapping operation by manipulating unloader head 20 to remove a first double-layer course from each of the stacks presented at the unloading station. The first course is transferred onto the receiving station and the unloader head 20 returns to lift and transfer a second set of double-layer courses in the same manner from the kiln car to the receiving position. As the unloader head 20 returns to the kiln car 10 for the third set of courses, the tyne course pickup head 34 moves into position to lift and remove the upper layer of said second course and selected tyne brick in the lower layer thereof. The tyne course pickup head 34 is moved to a position above an auxiliary table 38 whereupon the tyne bricks are released from the lower layer, while the upper layer is held in position for returning to the stack at a desired time.

The steps of manipulating the unloader head to remove double-layer courses from the stack of the kiln car and transfer such courses to the receiving station is continued until a desired stack of bricks is built at the receiving station, generally five courses or ten layers high. The upper layer of the second course may be returned to the stack as the unloader head 20 returns to the receiving station after any of its steps, it making no difference where the single upper layer of the second course is returned. After the tyne course pickup head has removed the tyne brick from the lower layer of the second course, separator boards are placed thereon before the next course is brought from the kiln car.

Additionally, if desired, the tyne course pickup head may be operated after each course is deposited at the receiving station to slightly lift the upper layer only of each course so that an operator may place a separator sheet between layers of each course. This is necessary in rail shipments, because railroads will not be responsible for freight damage claims if the separator sheets are omitted. In the present application, the tyne course is described as the lower layer of the second course or the third layer up from the bottom because this is conventionally used as the tyne course. The apparatus and method of the present invention is easily adapted to form the tyne course in any desired layer. It is readily apparent that if the tyne layer were to be formed in the upper layer of a course or if only single layers at a time were being unloaded, it would be necessary to lift only the tyne brick without disturbing the remaining bricks of that layer and without removing any layers thereabove.

Although the present invention, as illustrated and described, is adapted to process three stacks from the kiln car simultaneously, it is readily apparent that any number of stacks may be processed by varying the number of gripper frames on the unloader head. It is possible to process one or two stacks at a time, and the decision as to which size frame (single, double or triple) is dictated by the kiln car stacking system of the plant. Further, the reason the specification describes bricks being stacked in double-layer courses is because this is conventional in the industry. If other systems of stacking, such as triple-layers or single layers, the apparatus of the present invention could easily be adapted for use therewith.

There is thus provided an apparatus and method for unloading bricks from a kiln car and forming them into stacks at a receiving station of a proper size to be fed directly into a strapping machine by means of a combination unloader/stacker apparatus, which eliminates the extensive capital outlay of buying both an unloading apparatus and a stacking apparatus, as well as eliminating the conveyor therebetween.

Although preferred embodiments of the invention have been illustrated, it should be understood that various modifications may be resorted to without departing from the scope of the invention disclosed herein, which is to be limited only by the following claims.

What is claimed is:

1. A method of unloading a kiln car having a plurality of double-layer courses stacked thereon, each successive course thereof having the headers thereof facing perpendicular to the headers of the preceding course, building a stack of courses at a receiving station with all headers facing in a direction perpendicular to the plane of the straps to be applied at a strapping operation and transferring said stack of courses to a strapping head comprising the steps of:

a. manipulating an unloader-stacker head to remove a first double-layer course from a stack on said kiln car and place said course at a receiving station with the headers facing in a prescribed direction;

b. manipulating said unloader-stacker head to remove a second double-layer course from said stack on said kiln car and place said course atop said upper double-layer course at said receiving station with the headers facing in the same prescribed direction;

c. manipulating a tyne course pickup head after step (b) to lift the upper layer of said second course and selected tyne brick in the lower layer thereof, releasing said tyne brick onto an auxiliary table and holding said upper layer;

d. repeating step (a) a predetermined number of times to remove and place a further predetermined number of double-layer courses atop the stack at said receiving station to form a completed stack;

e. manipulating said tyne course pickup head after one of the double-layer courses is emplaced on said stack in step (d) to return said upper layer held in said tyne course pickup head to said stack at said receiving station; and f. transferring said completed stack as a unit from said receiving station to said strapping head.

2. The method according to claim 1 wherein said unloader-stacker head grips the courses from the sides of the brick rows, and said tyne course pickup head grips the layers from the ends of the brick columns.

3. The method according to claim 1 wherein said tyne course pickup head lifts the upper layer of each double-layer course after it is deposited at said receiving station to permit a separator sheet to be placed between said layers.

4. The method according to claim 1 wherein step (f) includes the steps of moving said stack as a unit in a path parallel to the longitudinal dimension of each brick to align the ends thereof, transferring said stack as a unit to a position adjacent the end of a strapping table, transferring said stack along said strapping table to said strapping head.

5. A method of unloading a kiln car having a plurality of stacks of bricks thereon, each stack including a plurality of double-layer courses, each successive course thereof having the headers thereof facing perpendicular to the headers of the preceding course, building a prescribed plurality of stacks simultaneously at a receiving station with all headers facing in a prescribed direction, and transferring said plurality of stacks simultaneously as a unit to said strapping head comprising the steps of:

a. manipulating an unloader-stacker head to simultaneously remove a first double-layer course from each of said prescribed plurality of stacks on said kiln car and place said first courses at a receiving station with the headers facing in said prescribed direction forming the lower course of a prescribed plurality of stacks at said receiving station;

b. manipulating said unloader-stacker head to simultaneously remove a second double-layer course from each of said prescribed plurality of stacks on said kiln car and place said second courses at said receiving station with the headers facing in the same prescribed direction;

c. manipulating a tyne course pickup head after step (b) to lift the upper layer of each of said second courses and selected bricks in the lower layer thereof, releasing said tyne brick onto an auxiliary table and holding said upper layer;

d. repeating step (b) a predetermined number of times to remove and place a further predetermined number of double-layer courses atop the stacks at said receiving station to form a prescribed number of completed stacks;

e. manipulating said tyne course pickup head after one of the double-layer courses is emplaced on said stacks in step (d) to return said upper layer held in said tyne course pickup head to said stacks at said receiving station; and f. transferring said completed stacks as a unit from said receiving station to said strapping head.

6. The method according to claim 5 wherein step (f) includes the steps of moving said stacks as a unit in a path parallel to the longitudinal dimension of each brick to align the ends thereof, transferring said stacks as a unit to a position adjacent the end of a strapping table, transferring said stacks along said strapping table to said strapping head.

7. An unloader-stacker apparatus for removing bricks from a kiln car having a plurality of double-layer courses stacked atop each other with the bricks adjacent courses facing in a direction perpendicular to each other and stacking said courses atop each other in preparation for transfer as a completed stack to a strapping head, said apparatus comprising the combination of:

a. a receiving station and an auxiliary table positioned above and spaced from said receiving station;

b. a first pickup means for successively gripping said double-layer courses of bricks from said stack on said kiln car and transferring said courses one at a time to a receiving station, said first pickup means depositing each course from said kiln car on the preceding course to build stacks of a predetermined number of courses;

c. a tyne course pickup head operated synchronously with said first pickup head and including means for gripping the upper layer and selected bricks of the lower layer of selected courses, transferring the bricks held thereby to a position above said auxiliary table, releasing said selected bricks in the lower layer onto said auxiliary table, and returning and depositing the upper layer to said stack at said receiving station.

8. The apparatus according to claim 7 wherein said first pickup means includes a carriage mounted for reciprocal movement between said kiln car and said receiving station, a plurality of gripper frames suspended from said carriage, the number of frames corresponding to the number of stacks to be moved during each cycle, said frames being connected with said carriage for planar pivotal movement of alternate courses, whereby each course of bricks is deposited at said receiving station facing in the same direction.

9. The apparatus according to claim 8 wherein said receiving station comprises one end onto which said courses are initially stacked, said one end including a table for receiving said courses and elevating means attached thereto for initially positioning said table at a prescribed elevation and successively lowering said table after each course is deposited thereon an increment equal to the height of each course, whereby said pickup means always deposits each course at the same level.

10. The apparatus according to claim 9 wherein said one end of said receiving station includes a pair of side walls substantially equal in height to the initial elevation of said table when in place for receiving the first course, whereby as courses are added side walls provide lateral support and prevent tipping of the stack.

11. The apparatus according to claim 10 further including a strapping table and wherein the other end of said receiving station includes a mobile barrow into which said stacks are pushed from said one end after they are formed, said barrow being mounted for reciprocal movement between said other end of said receiving station and the front end of said strapping table, and pushing means associated with said strapping table for removing the stacks from said mobile barrow on said strapping table and urging said stacks through a strapping head.

12. The apparatus according to claim 11 wherein said auxiliary table is positioned above the other end of the receiving station, said auxiliary table comprising a sliding plate movable from a position immediately above said mobile barrow to a position removed therefrom, said plate being positioned at an elevation aligned with the bottom of the upper course of said completed stacks and normally movable to said removed position as said stacks are pushed from said one end of said receiving station to said other end, said plate being selectively activated to remain stationary as said stacks without an upper course are pushed to said mobile barrow, then removed to release bricks thereon onto said stacks to form the upper course thereof.

13. The apparatus according to claim 12 and further including a gate movable between a position removed from said sliding plate during normal operation and a position adjacent said sliding plate when said tyne brick are to be deposited on the top of the stacks, whereby the gate blocks movement of the bricks with said sliding plate and causes them to be deposited on the stacks.

14. The apparatus according to claim 10 and further including a first slidable plate mounted immediately above the uppermost position of said table at said one end of said receiving station and horizontally slidable between a first position above said table and a second position above said other end of said receiving position, a first gate means mounted for reciprocal movement between a position removed from said first slidable plate and a second position in engagement with said slidable plate whereby during normal operation said double-layer courses are deposited on said first plate by said first pickup means then deposited onto said stack as said plate slides away with said first gate in said second position.

15. The apparatus according to claim 14 wherein said auxiliary table is positioned above the other end of the receiving station immediately above the second position of said first slidable plate, said auxiliary table comprising a second slidable plate movable from a position immediately above the second position of said second slidable plate and a second position removed therefrom, a second gate means movable between a first position removed from said second sliding plate during normal operation and a position adjacent said second sliding plate whereby as said tyne brick are formed into a complete double-layer course, said second gate is moved to said second position and said brick are deposited on said first sliding plate as said second plate is moved to its second position, said first gate means being moved to said first position during the return of said first slidable plate with the tyne brick deposited thereon in a double-layer course.

16. The apparatus according to claim 18 wherein said receiving station comprises a first set of rollers onto which a first course is deposited, the remaining courses being stacked on said first course, said first set of rollers including a moving means operative at a first speed for transferring said stacks onto the front end of a strapping table, said strapping table including a second set of rollers operative at a second, relatively slower speed to move said stacks past said strapping head.

17. The apparatus according to claim 8 further including a strapping table spaced from said receiving station and extending in a direction parallel to the longitudinal dimension of the bricks stacked at said receiving station and having said strapping head mounted thereon, and wherein said receiving station comprises a platform movable back and forth between a first, unloading position wherein one side of said platform is positioned adjacent a kiln car unloading position and a second, transfer position wherein said one side of said platform is aligned with the longitudinal axis of said strapping table, a first pushing means mounted on said platform for moving said brick stacks from said one end of said platform onto said strapping table at a first rapid rate of speed when said platform is in said second, transfer position, and a second pushing means for indexing said brick stacks along said strapping table at a prescribed slower rate of speed when said platform is in said first, unloading position.

18. The apparatus according to claim 17 wherein a pair of walls extend upwardly from said platform along said one side thereof for receiving bricks therebetween, said first pushing means comprises an air cylinder mounted adjacent one end of the area between said walls for movement therebetween, and said second pusher means comprises an indexing air cylinder mounted on said other side of aaid platform and aligned with said strapping table when said platform is in said first position.

19. The apparatus according to claim 18 and further including a vertically reciprocal gate movable between an operative and inoperative position and mounted adjacent the edge of said platform at a point aligned with said first pusher means at the other end of said walls and in the operative position blocking the movement of said brick stacks when said first pusher means is activated thereby grouping said stacks and aligning the ends of the bricks therein in preparation for the strapping operation.

20. A method of unloading a kiln car having a plurality of courses stacked thereon, each successive course thereof having the headers thereof facing perpendicular to the headers of the preceding course, and building a stack of courses at a receiving station with all headers facing in a prescribed direction by manipulating an unloader-stacker head to remove successive courses from a stack on said kiln car and place said courses successively at a receiving station with the headers facing in a prescribed direction, manipulating a tyne course pickup head after deposition of one of the courses and before deposition of the next successive course to remove a selected tyne brick in the uppermost course, and releasing said tyne brick onto an auxiliary table.

21. An unloader-stacker apparatus for removing bricks from a kiln car having a plurality of courses stacked atop each other with adjacent courses facing a direction perpendicular to each other and stacking said courses atop each other in preparation for a strapping operation at a strapping head, said apparatus comprising the combination of a receiving station, an unloader-stacker head for successively gripping the said courses of bricks from said stack on said kiln car and transferring said courses one at a time to said receiving station, depositing each course transferred from said kiln car on the preceding course to build stacks of a predetermined number of courses at the receiving station and a tyne course pickup head operative to act synchronously with the unloader-stacker head to pickup at said receiving station one or more selective bricks but not all the bricks of a selective uppermost course to leave a void therein and deposit said one or more selective bricks on an auxiliary table.

\* \* \* \* \*